United States Patent
Jiang et al.

(10) Patent No.: US 10,083,224 B2
(45) Date of Patent: *Sep. 25, 2018

(54) PROVIDING GLOBAL METADATA IN A CLUSTER COMPUTING ENVIRONMENT

(71) Applicant: International Business Machines Corporation, Armonk, NY (US)

(72) Inventors: Peng Hui Jiang, Beijing (CN); Yan Sun, Beijing (CN); Wen Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,728

(22) Filed: Jun. 12, 2017

(65) Prior Publication Data
US 2017/0277772 A1    Sep. 28, 2017

Related U.S. Application Data

(63) Continuation of application No. 15/070,232, filed on Mar. 15, 2016.

(51) Int. Cl.
*G06F 7/00* (2006.01)
*G06F 17/30* (2006.01)

(52) U.S. Cl.
CPC .. *G06F 17/30598* (2013.01); *G06F 17/30312* (2013.01); *G06F 17/30486* (2013.01); *G06F 17/30516* (2013.01); *G06F 17/30997* (2013.01)

(58) Field of Classification Search
CPC ......... G06F 17/30598; G06F 17/30486; G06F 17/30312; G06F 17/30516; G06F 17/30997

(Continued)

(56) References Cited

U.S. PATENT DOCUMENTS 8,478,800 B1    7/2013  Johnson et al.
8,959,075 B2    2/2015  Bird et al.
(Continued)

FOREIGN PATENT DOCUMENTS

WO    2013153027 A1    10/2013
WO    2015121304 A1    8/2015

OTHER PUBLICATIONS

Zaharia et al., "Spark: Cluster Computing with Working Sets," Proceedings of the 2nd USENIX conference on Hot topics in cloud computing, HotCloud '10, USENIX Association Berkeley, CA, USA, © 2010, pp. 1-7.

(Continued)

*Primary Examiner* — Md I Uddin
(74) *Attorney, Agent, or Firm* — Michael O'Keefe

(57) ABSTRACT

First and second data partitions that include first and second portions of data, respectively, from a first of a plurality of data streams are received. A first storage location of a distributed storage system, a first set of metadata for the first of the plurality of data streams is stored. A first and second digest is created for the data partitions, wherein each of the digests include a data structure that points to the first storage location. The data partitions including the digests are transmitted to one or more nodes of a cluster computing environment, wherein the one or more nodes are capable of accessing the first storage location via the data structure that points to the first storage location, and wherein the accessing of the first storage location provides processing information. The data partitions are processed using the processing information.

6 Claims, 9 Drawing Sheets

(58) Field of Classification Search
USPC ............................... 707/736, 737, 758, 958
See application file for complete search history.

(56) References Cited

U.S. PATENT DOCUMENTS

| | | | |
|---|---|---|---|
| 9,456,243 B1 * | 9/2016 | Hughes | H04N 21/44016 |
| 9,842,000 B2 * | 12/2017 | Bishop | G06F 17/30516 |
| 2015/0066646 A1 | 3/2015 | Sriharsha et al. | |

OTHER PUBLICATIONS

Mell et al., "The NIST Definition of Cloud Computing", National Institute of Standards and Technology, Special Publication 800-145, Sep. 2011, pp. 1-7.

Jiang et al., Pending U.S. Appl. No. 15/070,232, "Providing Global Metadata in a Cluster Computing Environment", filed Mar. 15, 2016, 40 Pages.

IBM: List of IBM Patents or Patent Applications Treated as Related (Appendix P), May 2, 2018, pp. 1-2.

* cited by examiner

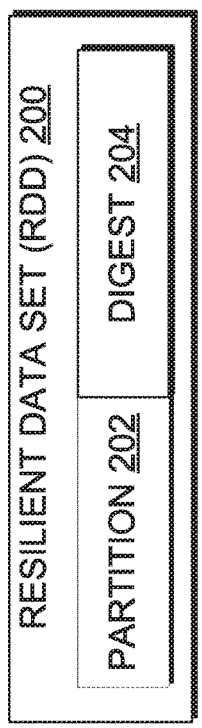
FIG. 2A
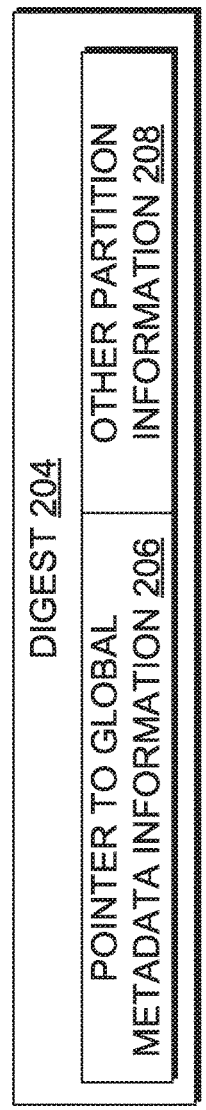
FIG. 2B
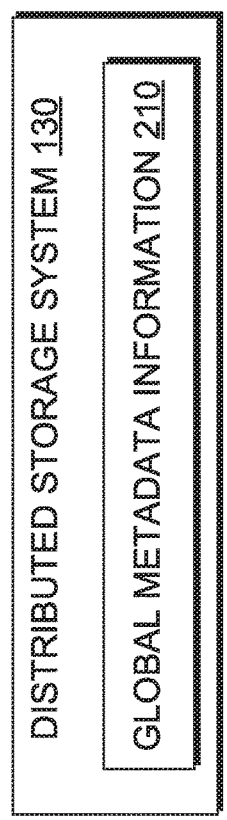

PROVIDING GLOBAL METADATA IN A CLUSTER COMPUTING ENVIRONMENT

FIELD OF THE INVENTION

The present invention relates generally to the field of data stream analysis in cluster computing environments, and more particularly providing, for each data partition of a data stream, a digest that points to globally accessible metadata.

SUMMARY

Embodiments of the present invention provide systems, methods, and computer program products for providing global metadata in a cluster computing environment. First and second data partitions that include first and second portions of data, respectively, from a first of a plurality of data streams are received. A first storage location of a distributed storage system, a first set of metadata for the first of the plurality of data streams is stored. A first and second digest is created for the first and second data partition, respectively, wherein each of the first and second digests include a data structure that points to the first storage location. The first and second data partitions including the first and second digest, respectively, is transmitted to one or more nodes of a cluster computing environment, wherein the one or more nodes are capable of accessing the first storage location via the data structure that points to the first storage location, and wherein the accessing of the first storage location provides processing information. The first and second data partition are processed using the processing information.

BRIEF DESCRIPTION OF THE DRAWINGS

FIG. 2A is a block diagram illustrating a data structure of a resilient distributed data set (RDD), in accordance with an embodiment of the present invention;

FIG. 2B is a block diagram illustrating a digest of an RDD, in accordance with an embodiment of the present invention;

DETAILED DESCRIPTION

Figure 1:
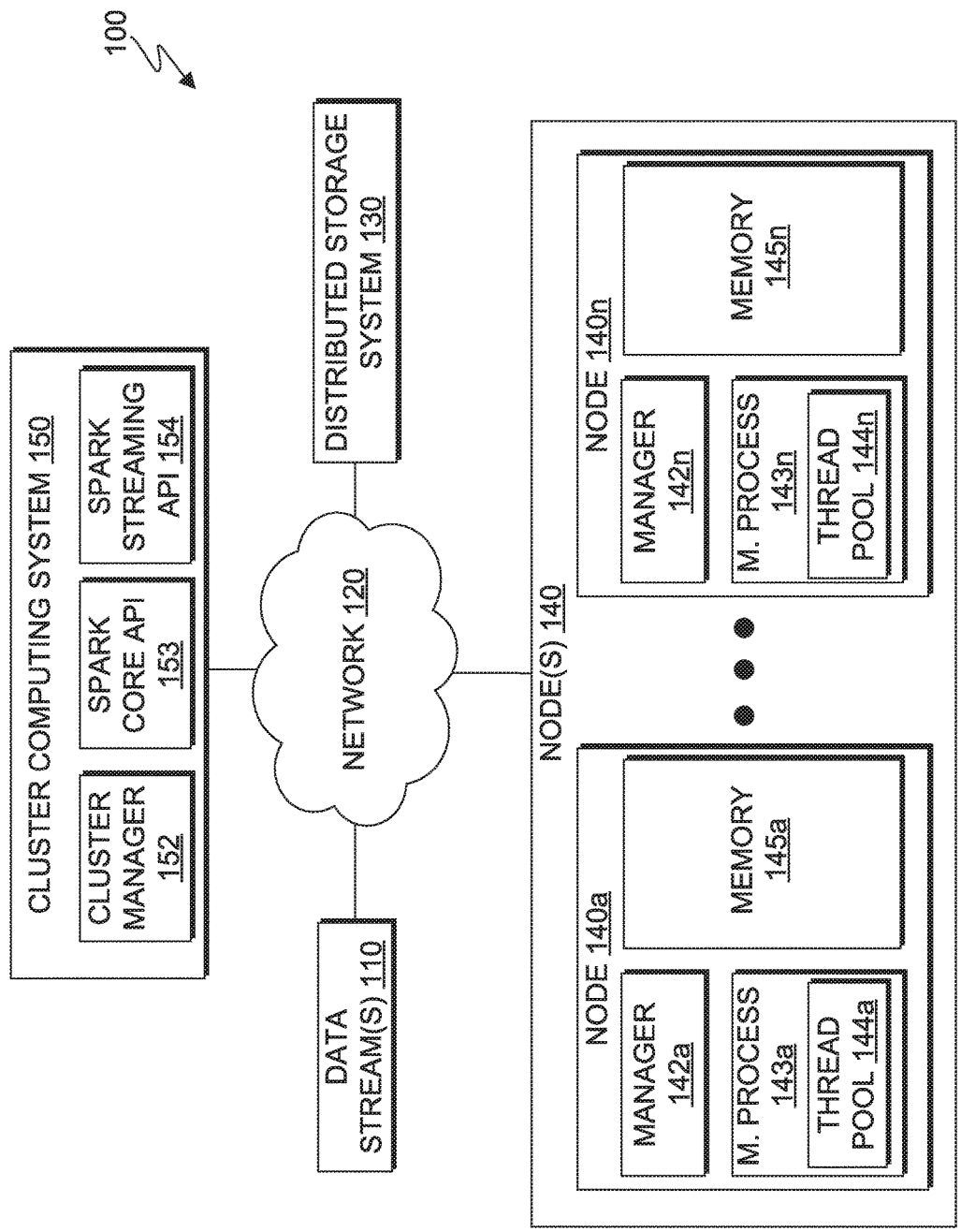
FIG. 1 is a block diagram of a cluster computing environment, in accordance with an embodiment of the present invention.

A data stream is a sequence of data made available over a period of time to a data management system, such as a cluster computing environment. Examples of data streams can include sensor data (e.g., temperature measurements, location information, etc.), real time image data (e.g., satellite images, surveillance images, etc.), as well as internet and web traffic (e.g., Transmission Control Protocol and Internet Protocol (TCP/IP) packets, search queries, user web page navigation, etc.). Typically, more than one data stream can be processed by a cluster computing environment, where each data stream can be made available to the cluster computing environment at varying rates and can include varying data types.

A cluster computing environment can receive, process, and analyze data from incoming data streams to aid users (i.e., an enterprise, an organization, etc.) in real time decision making. For example, a banking institution can receive and process data from incoming data streams (e.g., transaction data, etc.), and analyze the processed data to detect fraudulent activity. A cluster computing environment can analyze processed data from incoming data streams with applications that can perform data analytics, data mining, and other stream analytic capabilities. For example, applications can process queries and algorithms, such as machine learning algorithms and graph processing algorithms, on processed data from incoming data streams, which are expressed by functions and operations (e.g., map, reduce, join, window, etc.). Analyzed data can be stored in one or more shared storage resources of the cluster computing environment.

Cluster computing environments may differ from other data management systems, such as database management systems, because cluster computing environments may not control a rate in which the data of incoming data streams are made available (i.e., received). In comparison, a database management system may control a rate in which the data is received (i.e., a rate in which data is read from storage resources). Accordingly, the database management system may not be faced with an issue of missing or lost data as the database management system executes queries, whereas the if data is missing or lost as the cluster computing environment analyzes data from a data stream, then the results of the analysis may be affected and have an undesirable effect on decisions made by users of the cluster computing environment.

A cluster computing environment, such as a Spark® v1.6.0 streaming computing environment available from Apache Software Foundation, can analyze data from data streams by processing the data into batches of data, or resilient distributed datasets (RDDs). RDDs can be processed by the cluster computing environment, may be operated in parallel by nodes of a cluster. Each RDD may contain serialized data partitions that can be allocated to nodes of a Spark® streaming computing environment for parallel computing. Typically in a Spark® streaming computing environment, a node that is allocated a data partition has access to serialization information for the data partition only, but not serialization information for other data partitions that were allocated to other nodes. Furthermore, global metadata, such as information regarding a data stream from which each partition originates, such as a name, a location, an owner, a size, is not available to components of a Spark® streaming computing environment. Global metadata can be useful to a cluster computing environment in instances where more than one data stream is processed and analyzed.

Accordingly, an additional pointer data structure pointing to global metadata, can be provided in each data partition, such that the global metadata, and additional processing information are available as a shared variable area for components of a cluster computing environment, such as a Spark® streaming computing environment.

Embodiments of the present invention provide methods, systems, and computer program products for generating a digest for each data partition in an RDD. Embodiments of the invention can store information referenced by each digest in a shared variable area of a cluster computing environment, such as a Spark® streaming computing environment, such that each node in the Spark® streaming computing environment may access information stored in the shared variable area.

FIG. 1 is a block diagram of cluster computing environment 100, in accordance with an embodiment of the present invention. In this embodiment, cluster computing environment 100 is an open cluster computing framework, such as a Spark® streaming computing environment. Cluster computing environment 100 can execute Spark® applications to process and analyze data. A "Spark® application," as used herein, refers to a job or a sequence of jobs involving a self-contained computation that executes user-supplied software code to compute a result. A "job," as used herein, refers to a portion of software code that reads data, performs a computation or transformation on the data, and writes output data. Jobs can be divided into tasks (e.g., map, reduce, etc.), based on computational boundaries and/or limits of each job, where a task is a unit of work within a job that is performed on a portion of input data (e.g., a data partition), as described in greater detail below.

Cluster computing environment 100 includes cluster computing system 150 and nodes 140, which are connected via network 120. Cluster computing system 150 and nodes 140 can be desktop computers, laptop computers, specialized computer servers, or any other computer systems known in the art. In certain embodiments, cluster computing system 150 and nodes 140 represent computer systems utilizing clustered computers and components to act as a single pool of seamless resources when accessed through network 120. For example, such embodiments may be used in data center, cloud computing, storage area network (SAN), and network attached storage (NAS) applications. In certain embodiments, cluster computing system 150 and nodes 140 represent virtual machines. In general, cluster computing system 150 and nodes 140 are representative of any electronic devices, or combination of electronic devices, capable of executing machine-readable program instructions, in accordance with an embodiment of the present invention, as described in greater detail with regard to FIG. 7. In other embodiments, cluster computing system 150 and nodes 140 may be implemented in a cloud computing environment, as described in greater detail with regard to FIGS. 8 and 9.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between cluster computing system 150 and nodes 140, in accordance with an embodiment of the invention.

Data streams 110 represent one or more sequences of data made available over a period of time to cluster computing environment 100. Data streams 110 can originate from one or more data sources that provide varying types of data (e.g., sensor data, image data, internet/web traffic data, etc.) at varying rates. For example, data streams 110 can include temperature sensor data provided by a temperature measurement device that transmits temperature sensor data to cluster computing environment 100 at regular intervals, as well as search queries received asynchronously by a search engine that transmits the search queries to cluster computing environment 100 as the search queries are received.

Distributed storage system 130 represents one or more storage repositories configured for shared storage access for nodes 140 and cluster computing system 150. In this embodiment, distributed storage system 130 may be a fault-tolerant storage system, such that each storage component of distributed storage system 130 (e.g., a server computer) includes a portion of filesystem data. Distributed storage system 130 can provide high throughput access to application data, such that Spark® applications can have streaming access to the application data. In this embodiment, distributed storage system 130 interfaces with a Spark® streaming computing environment. For example, distributed storage system 130 may include: Hadoop® Distributed File System (HDFS), MapR® File System (MapR-FS), Cassandra®, OpenStack Swift, Amazon® S3, Kudu, or combinations thereof. All trademarks used herein are the property of their respective owners.

Cluster computing system 150 represents a Spark® platform that receives data from data streams 110, processes the data streams, and transmits the processed data to nodes 140, as well as manages and executes Spark® applications. In this embodiment, cluster computing system 150 includes several application programming interfaces (APIs), such as cluster manager 152, Spark® Core API 153, and Spark® Streaming API 154.

Cluster manager 152 represents program functionality for allocating and managing resources and/or tasks for each of nodes 140 to perform Spark® applications. For example, cluster manager 152 can interact with a Java Virtual Machine (JVM) in one or more nodes 140 to manage and allocate resources and/or tasks.

Spark® Core API 153 represents program functionality for distributed task dispatching, task scheduling, and basic input/output (I/O) functionalities for Spark® applications. Spark® Core API 153 is the underlying general execution engine for cluster computing system 150 that all other functionality is built on top of (e.g., Spark® Streaming API 154). Spark® Core API 153 provides in-memory computing capabilities to deliver high-speed throughput of data from data streams 110, a generalized execution model to support a wide variety of applications, as well as to support Java®, Scala®, and Python® APIs for ease of development.

Spark® Streaming API 154 represents program functionality for load balancing, unification of streaming, batch, and interactive workloads, failure recovery, and advanced data analytics, such as machine learning and Structured Query Language (SQL®) queries. Spark® Streaming API 154 designates one of nodes 140 to buffer data from data streams 110 into batches, as described in greater detail with regard to FIG. 2. In this embodiment, Spark® Streaming API 154 leverages functions of Spark® Core API 153 and relies on batches of data from data streams 110 to write processed data stream 110 information to a filesystem of distributed storage system 130. In this embodiment, Spark® Streaming API 154 can maintain state information for a particular Spark® application (i.e., all stored information at a given time, to which a Spark® application has access) based on data from data streams 110. Spark® Streaming API 154 may be configured to perform window operations, such that a developer using cluster computing environment 100 can specify a time interval and execute Spark® applications on processed data that is made available within the time interval. In this embodiment, Spark® Streaming API 154 creates an additional data structure, or a digest, that includes a pointer to global metadata, and other data partition information, for each data partition processed in cluster computing environment 100, as described in greater detail below.

Nodes 140 represent platforms in a computer cluster that allocate resources to perform Spark® applications. In this embodiment, nodes 140 may include "n" number of nodes 140, as illustrated by nodes 140*n*, where the cluster of nodes 140 are viewed as a single computer system managed by cluster manager 152. For example, a computer cluster in cluster computing environment 100 can include "n" number of nodes 140, where "n" is 10 nodes 140 (e.g., nodes 140*a-j*, not depicted). Each of nodes 140 may be configured for specialized and/or dedicated functions and include a number of JVMs and storage resources. In one embodiment, cluster computing system 150 can be a master node 140 that designates a receiving node 140*a* to buffer data from data streams 110 into batches, as described in greater detail below.

Managers 142 represent JVMs that manage received requests from cluster manager 152 for one or more resources to perform distributed computing tasks. In this embodiment, managers 142 are configured to allocate memory resources (e.g., memory 145*a*, and memory 145*n*, respectively) and processing unit resources (e.g., threads in thread pool 144*a*, and threads in thread pool 144*n*, respectively) as described in greater detail below.

Manager process 143*a* and manager process 143*n* represent JVMs to perform tasks for an individual Spark® application and store output data. For example, manager process 143*a* is spawned and managed by manager 142*a*, and is configured to perform all tasks for a first Spark® application. In another example, manager process 143*n* is spawned and managed by manager 142*n*, and is configured to perform all tasks for a second Spark® application. Typically, Spark® applications can be isolated from each other, which may be beneficial for scheduling tasks for each Spark® application and beneficial for managing tasks for each of manager processes 143*a* and 143*n*. However, because Spark® applications are typically considered isolated, data for each Spark® application may not be shared without writing the data to an external storage system (e.g., distributed storage system 130). In contrast, in this embodiment, global metadata and additional processing information is available as a shared variable area, such that Spark® applications are no longer isolated.

Thread pool 144 and thread pool 144*n* represent collections of threads that can be allocated by manager 142*a* and manager 142 for tasks performed by manager process 143*a* and manager process 143*n*, respectively. In this embodiment, thread pools 144 consist of any number of threads that can be allocated to perform any number of tasks in parallel. For example, manager process 143*a* may be assigned to perform five tasks for a first Spark® application, such that manager 142*a* allocates five threads from thread pool 144*a*, where each of the five threads from thread pool 144*a* are dedicated to perform one of the five tasks.

Memories 145 represent computer-readable storage media for nodes 140, respectively. In this embodiment, each memory 145 includes random access memory (RAM) and cache memory. In general, a memory 145 can include any suitable volatile or non-volatile computer-readable storage media that can store data while its respective manager process 143 performs tasks.

FIG. 2A is a block diagram illustrating a data structure of RDD 200, in accordance with an embodiment of the present invention. The term, "resilient distributed dataset," as used herein, is a basic abstraction in a Spark® streaming computing environment (e.g., cluster computing environment 100) representing a sequence of data, such that developers and programmers can perform in-memory computations on large clusters in a fault-tolerant manner. For example, RDD 200 can include serializable data partitions (e.g., partition 202), where each data partition references a subset, or a portion, of data from one data stream 110. A data partition of RDD 200, such as partition 202, can be transmitted to a plurality of nodes 140 for distributed parallel processing In this embodiment, partition 202 in RDD 200 includes digest 204 provided by Spark® Streaming API 154, as described in greater detail with regard to FIG. 2B. In another embodiment, RDD 200 can include more than one data partition, where each of the more than one data partitions include a respective digest.

FIG. 2B is a block diagram illustrating digest 204 of RDD 200, in accordance with an embodiment of the present invention. In this embodiment, Spark® Streaming API 154 creates digest 204 which includes a pointer to global metadata 206 and other partition information 208 for partition 202. Other partition information 208 for partition 202 can include: serialization information for partition 202, an encode and/or a decode method for partition 202, and other information for the partition 202. In one embodiment, a node 140 stores partition 202 and digest 204 in its memory 145, such that the node 140 can access digest 204 to reference necessary information during task completion, such as information that identifies one of data streams 110 that RDD 200 originates from, and information that identifies an offset of partition 202.

The pointer to global metadata 206 points to a storage location distributed storage system 130 containing global metadata 210. In this embodiment, global metadata 210 is metadata for a data stream 110 source (e.g., a file stream) that RDD 200 originates from, where global metadata 210 includes: a file name, a file location, a file owner, a file size, and other data stream 110 source information. Global metadata 210 can be a shared variable area in distributed storage system 130, such that each of nodes 140 having access to the shared variable area can read from and/or write to it.

Figure 3:
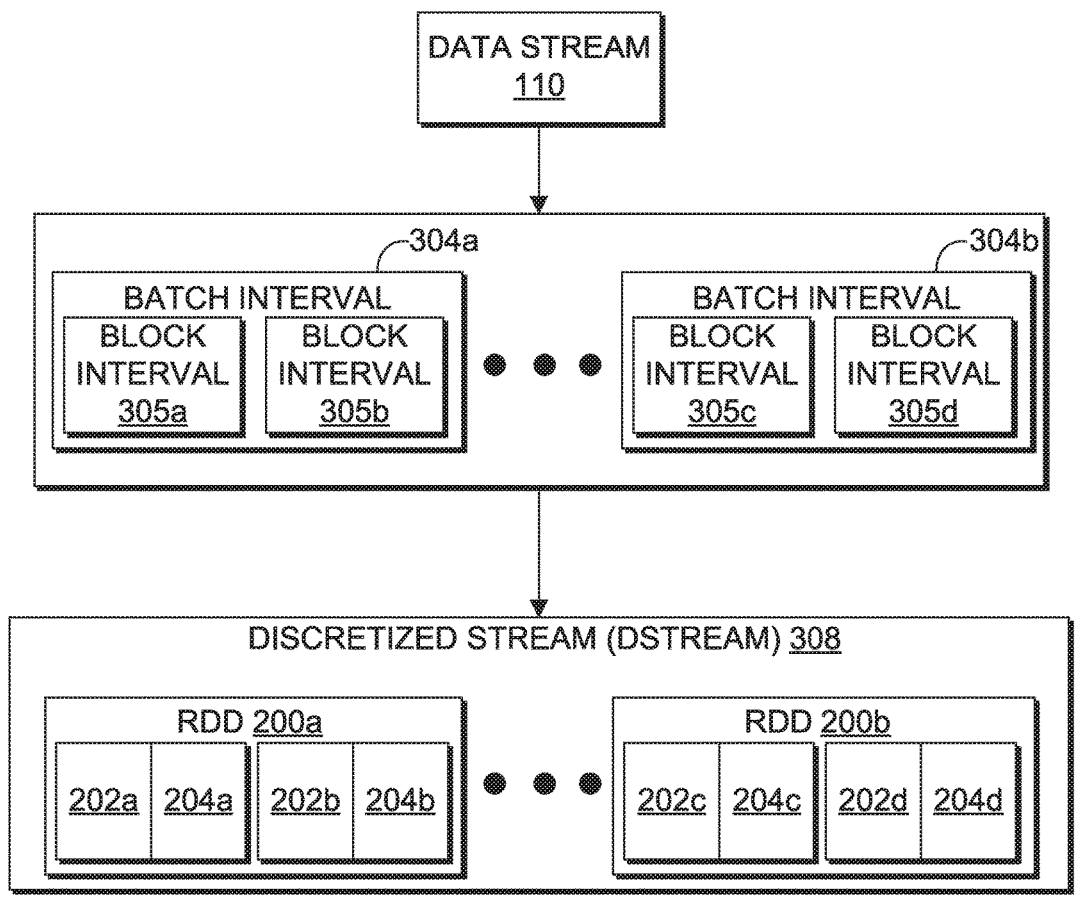
FIG. 3 is a block diagram illustrating a process for generating discretized stream (DStream) from one data stream, in a cluster computing environment, in accordance with an embodiment of the present invention.

FIG. 3 is a block diagram illustrating a process for generating discretized stream (DStream) 308 from one data stream 110 in cluster computing environment 100, in accordance with an embodiment of the present invention. In this embodiment, cluster computing system 150 processes one data stream 110 to generate DStream 308 including RDD 200*a* and RDD 200*b*. The term, "DStream" as used herein, refers to a basic abstraction in a Spark® streaming computing environment (i.e., cluster computing environment 100), where DStream 308 can be represented as a sequence of RDDs 200 (e.g., RDD 200*a* and RDD 200*b*).

Data from a data stream 110 can buffered into batches by cluster computing system 150. For example, cluster computing system 150 or one of nodes 140 can buffer data from the data stream 110 into batch interval 304*a* and batch interval 304*b*. The term, "batch interval," as used herein refers to a predefined time interval at which cluster computing system 150 buffers one data stream 110 into a batch. For example, a predefined time interval can be one second, such that cluster computing system 150 buffers data from one data stream 110 into a batch every second. Typically, a predefined time interval for buffering data from data stream 110 into a batch can be based on: a buffer size, time to process the buffered data, likelihood of an error occurring that requires a resend of the data. A batch interval size, or predefined time interval can be adjusted dynamically based on error rate or data throughput. Accordingly, batch interval 304a represents a first batch buffered at a first time (e.g., one second from the data stream 110 processing starting time), and batch interval 304b represents a second batch buffered at a second time (e.g., two seconds from the data stream 110 processing starting time).

In this embodiment, batch interval 304a and batch interval 304b include block intervals 305a and 305b, and block intervals 305c and 305d, respectively. The term, "block interval," as used herein refers to a portion of data from the one data stream 110 that is separated by a predefined time interval that is less than a predefined time interval for a batch interval. For example, a predefined time interval can be 500 milliseconds, such that cluster computing system 150 separates portions of the one data stream 110 every 500 milliseconds. Accordingly, block interval 305a represents a first portion of data from the one data stream 110 generated at a first time (e.g., 500 milliseconds from the data stream 110 processing starting time), block interval 305b represents a second portion of data from the one data stream 110 generated at a second time (e.g., 1000 milliseconds from the data stream 110 processing starting time), block interval 305c represents a third portion of data from the one data stream 110 generated at a third time (e.g., 1500 milliseconds from the data stream 110 processing starting time), and block interval 305d represents a fourth portion of data from the one data stream 110 generated at a fourth time (e.g., from the data stream 110 processing starting time).

Cluster computing system 150 may define DStream 308 as a continuous stream of data buffered into batch interval 304a and batch interval 304b, such that block intervals 305a, 305b, 305c, and 305d are defined as partitions 202a, 202b, 202c, and 202d, respectively. As previously described, Spark® Streaming API 154 creates a digest for each of partitions 202a-d, which are represented by digests 204a-d. Cluster computing system 150 generates RDDs 200a and 200b, such that each of RDDs 200a and 200b can be processed using operations (e.g., map, reduce, reduceByKey, join, window, etc.). The results from performing operations on RDDs 200a and 200b can be returned in batches, and stored in distributed storage system 130 for subsequent analysis, report and/or dashboard generation, or sending event based alerts.

Figure 4:
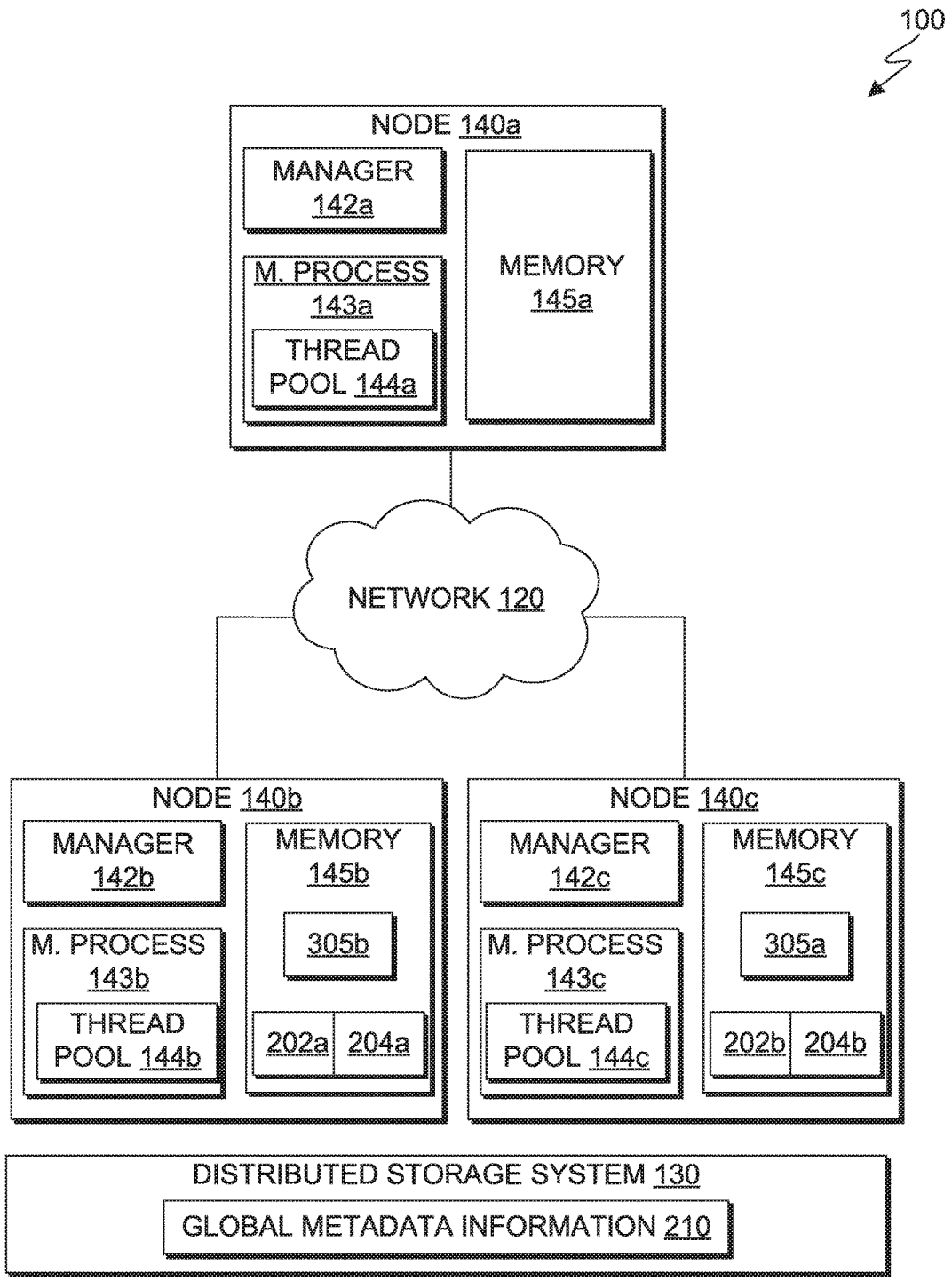
FIG. 4 is a block diagram of nodes in a cluster computing environment, in accordance with an embodiment of the present invention.

FIG. 4 is a block diagram of nodes 140a-c in cluster computing environment 100, in accordance with an embodiment of the present invention. In this embodiment, node 140a is a receiving node that allocates a receiving thread from thread pool 144a to receive data from a data stream 110, such that data from the data stream 110 is streaming into the receiving thread in node 140a. For a first batch interval, such as batch interval 304, node 140a can buffer the received data for the first batch interval to node 140b and node 140c. Node 140a transmits block interval 305a to both nodes 140b and 140c, where node 140b processes block interval 305a as partition 202a that includes digest 204a, and where node 140c stores block interval 305a in memory 145c to provide data availability and resiliency across cluster computing environment 100. Similarly, Node 140a transmits block interval 305b to both nodes 140b and 140c, where node 140a processes block interval 305b as partition 202b that includes digest 204b, and where node 140b stores block interval 305b in memory 145b to provide data availability and resiliency across cluster computing environment 100.

In this embodiment, digests 204a is stored in memory 145a and digest 204b is stored in memory 145b. As previously described, each of digests 204a and 204b includes one pointer to global metadata 206, which points to a storage location in distributed storage system 130 containing global metadata 210. Node 140b may process partition 202a using digest 204a including other partition information 208 for partition 202a stored in memory 145a, and using global metadata 210 stored in distributed storage system 130. Similarly, node 140c may process partition 202b using digest 204b including other partition information 208 for partition 202b stored in memory 145c, and using global metadata 210 stored in distributed storage system 130. Accordingly, both nodes 140b and 140c can process in parallel, partition 202b and 202a, respectively, and both nodes 140b and 140c may access a shared variable area in distributed storage system 130 containing global metadata to identify a name of data stream 110 that partitions 202a and 202b originate, a location of data stream 110, an owner of data stream 110, a size of data stream 110, and other data stream 110 information.

Figure 5:
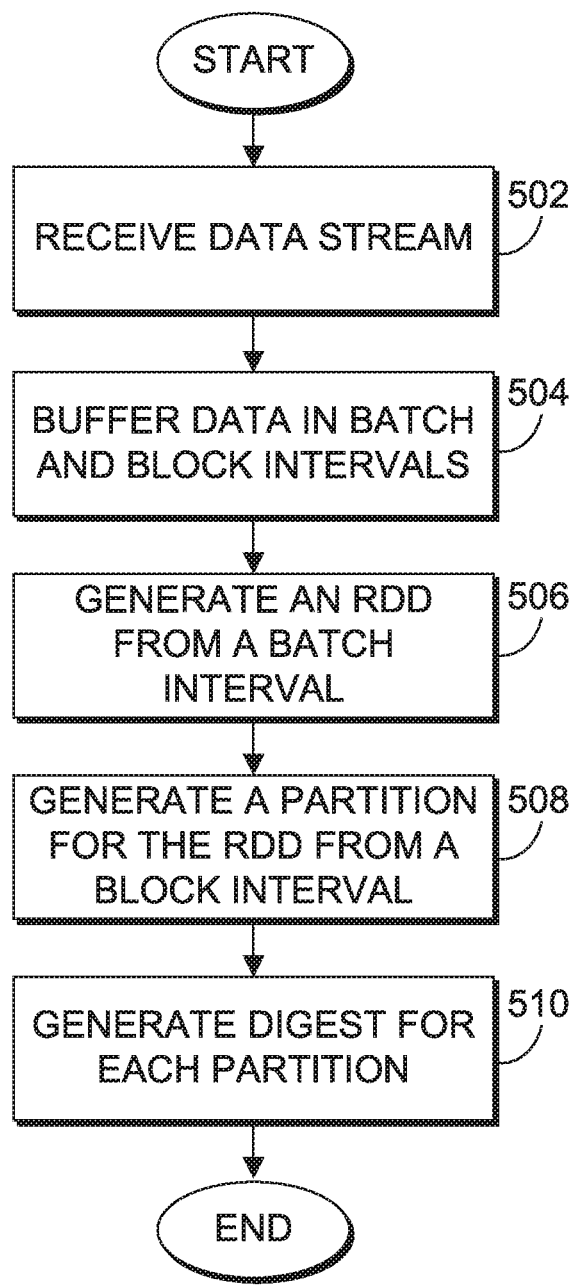
FIG. 5 is a flowchart illustrating operational steps for generating a digest for a data partition by a cluster computing environment as illustrated in FIGS. 1 and 4, in accordance with an embodiment of the present invention.

FIG. 5 is a flowchart illustrating operational steps for generating a digest for a respective partition by cluster computing environment 100 as illustrated in FIGS. 1 and 4, in accordance with an embodiment of the present invention. Data from data stream 110 is received (steps 502). The data from data stream 110 is buffered into batch interval 304a including block interval 305a and block interval 305b (step 504). Generate RDD 200a from batch interval 304a (step 506). Generate partition 202a from block interval 305a and partition 202b from block interval 305b (step 508). Generate digest 204a for partition 202a and digest 204b for partition 202b (step 510).

Figure 6:
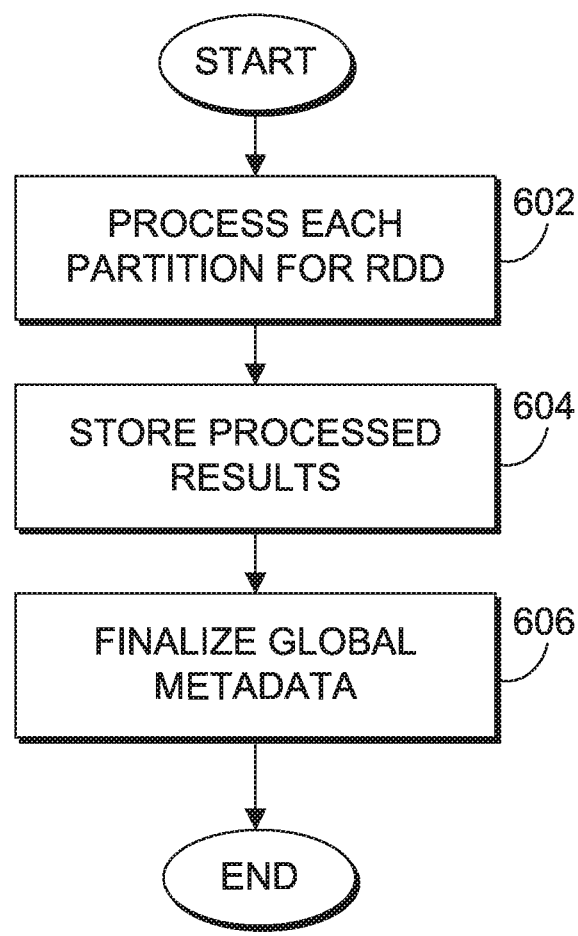
FIG. 6 is a flowchart illustrating operational steps for finalizing global metadata by a cluster computing environment as illustrated in FIGS. 1 and 4, in accordance with an embodiment of the present invention.

FIG. 6 is a flowchart illustrating operational steps for finalizing global metadata 210 by cluster computing environment 100 as illustrated in FIGS. 1 and 4, in accordance with an embodiment of the present invention. Each of partitions 202a and 202b are processed in parallel by nodes 140 (step 602). The results from processing partitions 202a and 202b are stored in distributed storage system 130 (step 604). Global metadata 210 is finalized, such that portions of global metadata 210 that are no longer required by cluster computing environment 100 are removed (step 606).

Figure 7:
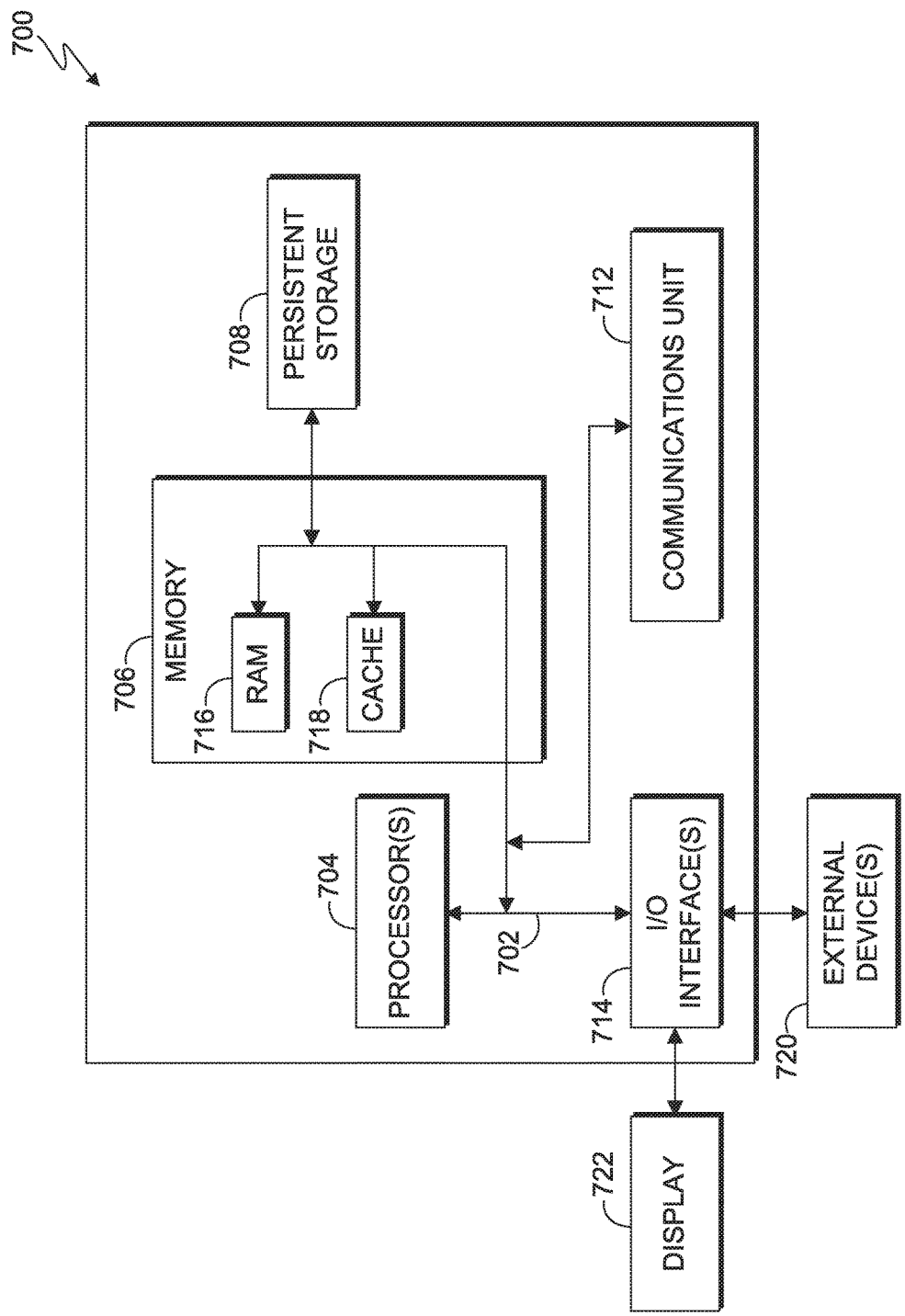
FIG. 7 is a block diagram of internal and external components of the computer systems of FIG. 1, in accordance with an embodiment of the present invention.

FIG. 7 is a block diagram of internal and external components of a computer system 700, which is representative the computer systems of FIG. 1, in accordance with an embodiment of the present invention. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 700 includes communications fabric 702, which provides for communications between one or more processors 704, memory 706, persistent storage 708, communications unit 712, and one or more input/output (I/O) interfaces 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 516 and cache memory 718. In general, memory 706 can include any suitable volatile or non-volatile computer-readable storage media. Software is stored in persistent storage 708 for execution and/or access by one or more of the respective processors 704 via one or more memories of memory 706.

Persistent storage 708 may include, for example, a plurality of magnetic hard disk drives. Alternatively, or in addition to magnetic hard disk drives, persistent storage 708 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 708 can also be removable. For example, a removable hard drive can be used for persistent storage 708. Other examples include optical and magnetic disks, thumb drives, and smart cards that are inserted into a drive for transfer onto another computer-readable storage medium that is also part of persistent storage 708.

Communications unit 712 provides for communications with other computer systems or devices via a network (e.g., network 120). In this exemplary embodiment, communications unit 712 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 712 (e.g., via the Internet, a local area network or other wide area network). From communications unit 712, the software and data can be loaded onto persistent storage 708.

One or more I/O interfaces 714 allow for input and output of data with other devices that may be connected to computer system 700. For example, I/O interface 714 can provide a connection to one or more external devices 720, such as a keyboard, computer mouse, touch screen, virtual keyboard, touch pad, pointing device, or other human interface devices. External devices 720 can also include portable computer-readable storage media such as, for example, thumb drives, portable optical or magnetic disks, and memory cards. I/O interface 714 also connects to display 722.

Display 722 provides a mechanism to display data to a user and can be, for example, a computer monitor. Display 722 can also be an incorporated display and may function as a touch screen, such as a built-in display of a tablet computer.

Figure 8:
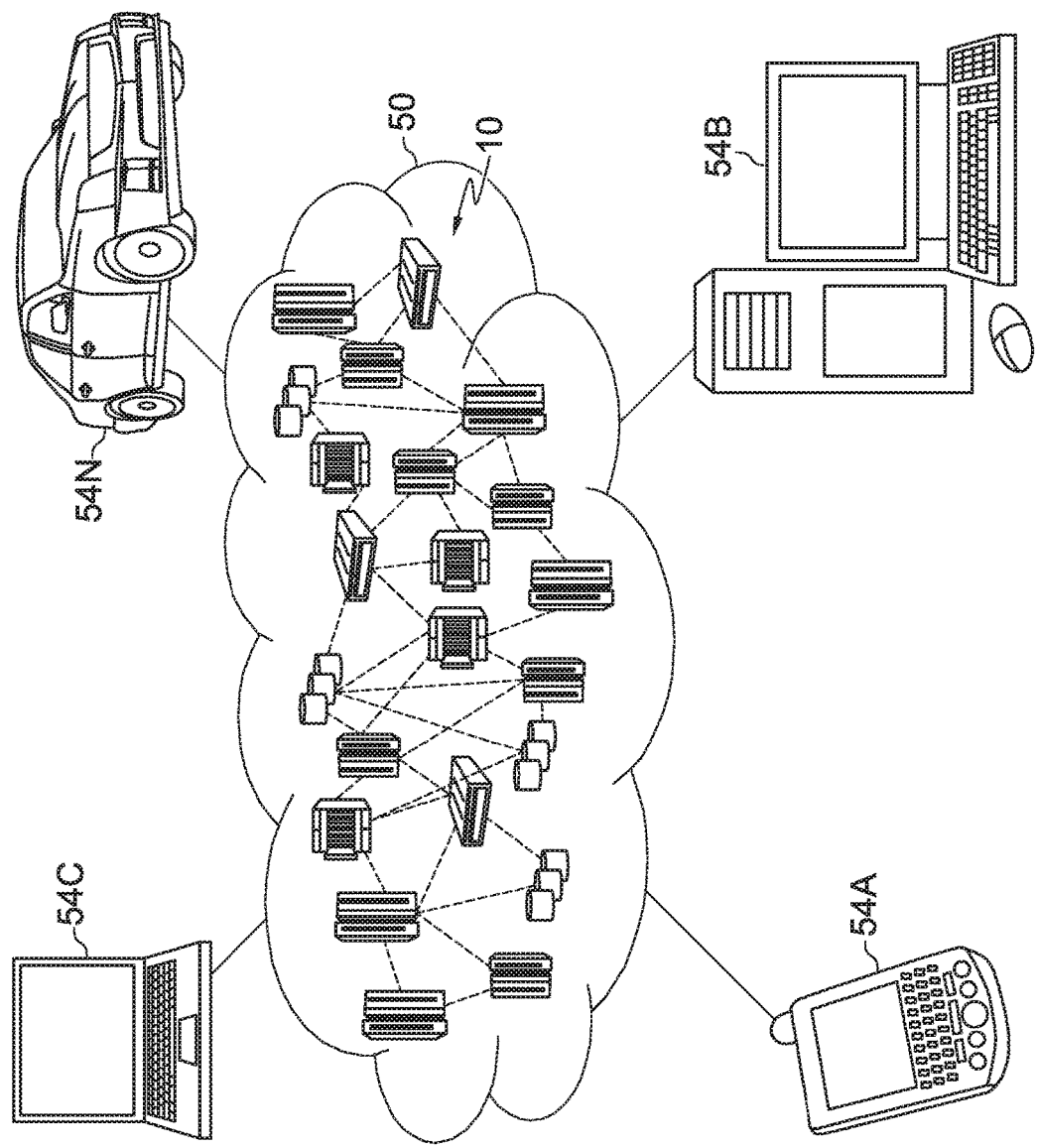
FIG. 8 depicts a cloud computing environment, in accordance with an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 9 are intended to be illustrative only and that cloud computing nodes 10 and cloud computing environment 50 can communicate with any type of computerized device over any type of network and/or network addressable connection (e.g., using a web browser).

Figure 9:
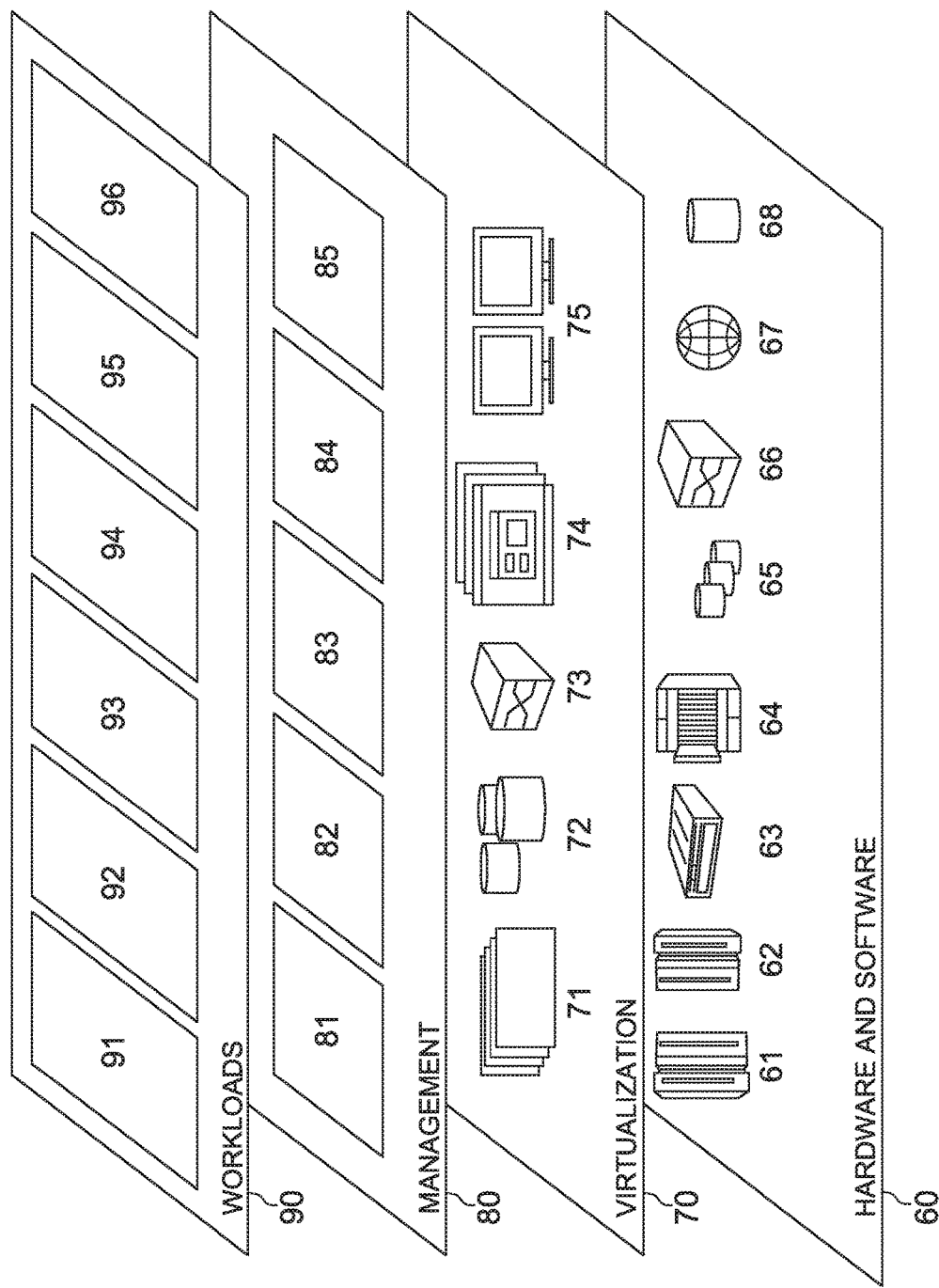
FIG. 9 depicts abstraction model layers, in accordance with an embodiment of the present invention.

Referring now to FIG. 9, a set of functional abstraction layers provided by cloud computing environment 50 (FIG. 8) is shown. The components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cluster computing environment 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a digest for each data partition in order to process more than one data stream comprising:
    receiving, by one or more computer processors, first and second data partitions that include first and second portions of data, respectively, from a first of a plurality of data streams in a cluster computing environment, wherein receiving the first and the second data partition that includes the first and the second portion of data, respectively, comprises:
        buffering, by the one or more computer processors, for a first predefined time interval, the first and second portion of data from the first of the plurality of data streams into a first and second batch interval, respectively, wherein the first batch interval is buffered before the second batch interval;
        defining, by the one or more computer processors, a discretized stream including the first and second batch interval, wherein the discretized stream comprises a resilient distributed dataset (RDD) representing a sequence of data including serializable data partitions to perform in-memory computations on large clusters in a fault-tolerant manner; and
        receiving, by the one or more computer processors, the discretized stream including the first and second batch intervals representing the first and second portion of data from the first of the plurality of data streams, respectively;

storing, by the one or more computer processors, in a first storage location of the cluster computing environment, a first set of metadata for the first of the plurality of data streams;

generating, by the one or more computer processors, a first and second digest for the first and second data partition based on the stored first storage location of the cluster computing environment, respectively, wherein each of the first and second digests include a data structure that points to the first set of metadata;

transmitting, by a computer system, the first and second data partitions including the first and second digest, respectively, to one or more nodes of a cluster computing environment, wherein the one or more nodes are capable of accessing the first storage location via the data structure that points to the first storage location, and wherein the accessing of the first storage location provides processing information; and processing, by the one or more computer processors, the first and second data partition using the processing information.

2. The method of claim 1, further comprising:

receiving, by one or more computer processors, a third and a fourth data partition that includes a first and a second portion of data from a second of the plurality of data streams, respectively;

storing, by the one or more computer processors, in a second storage location of the distributed storage system, a first set of metadata for the second of the plurality of data streams;

creating, by the one or more computer processors, a third and fourth digest for the third and fourth data partition, respectively, wherein each of the third and fourth digests include a data structure that points to the second storage location;

transmitting, by the one or more computer processors, the third and fourth data partition including the third and fourth digest, respectively, to the one or more nodes of the cluster computing environment, wherein the one or more nodes are capable of accessing the second storage location via the data structure that points to the second storage location, and wherein the accessing of the second storage location provides processing information; and processing, by the one or more computer processors, the third and fourth partition using the processing information.

3. The method of claim 1, wherein the cluster computing environment is a Spark® streaming computing environment, available from Apache Software Foundation.

4. The method of claim 1, wherein the first and second digest include additional data partition information for the first and second data partition, respectively.

5. The method of claim 1, wherein the first set of metadata for the first of the plurality of data streams include: a name of the first of the plurality of data streams, a location of the first of the plurality of data streams, an owner of the first of the plurality of data streams, a size of the first of the plurality of data streams, and the processing information, and wherein the first set of metadata is metadata for a source of the first of the plurality of data streams including a file name.

6. The method of claim 3, further comprising:

generating, by the one or more computer processors, a resilient distributed dataset from a received batch interval representing a portion of data from one of the plurality of data streams; and buffering, by the one or more computer processors, for a second predefined time interval, a subset of the portion of data from one of the plurality of data streams as a first data partition.

* * * * *